United States Patent [19]

Barber et al.

[11] 4,016,619
[45] Apr. 12, 1977

[54] CAR WASHING APPARATUS HAVING SLOW SPEED RELIEF

[75] Inventors: Ivan J. Barber, Mississauga; Calvin Whetham, Weston, both of Canada

[73] Assignee: The Allen Group Inc., Melville, N.Y.

[22] Filed: Oct. 2, 1975

[21] Appl. No.: 618,742

[52] U.S. Cl. .................................... 15/53 AB
[51] Int. Cl.² ...................................... B60S 3/00
[58] Field of Search .......... 15/53 A, 53 AB, DIG. 2

[56] References Cited
UNITED STATES PATENTS

| | | | |
|---|---|---|---|
| 3,506,995 | 4/1970 | Larson et al. | 15/53 AB |
| 3,624,851 | 12/1971 | Barber | 15/53 AB |
| 3,691,578 | 9/1972 | Barber | 15/53 AB |
| 3,755,844 | 9/1973 | Ennis | 15/53 AB |
| 3,761,986 | 10/1973 | Rickel | 15/53 AB |

*Primary Examiner*—Christopher K. Moore
*Attorney, Agent, or Firm*—Fulwider, Patton, Rieber, Lee & Utecht

[57] ABSTRACT

Car washing apparatus including a primary arm pivotally supported at one end and extending rearwardly along the path of the car, a secondary arm pivotally supported on the free end of the primary arm and extending across the path of the car, and a rotary brush on the free end of the secondary arm. A secondary cylinder is connected between the primary and secondary arms, and the rod and blind ends of the cylinder are connected through flow controls to the control inlets of a 4-way valve. The 4-way valve controls a primary arm cylinder which retracts and extends the primary arm as required. When a car strikes the brush, the pressure increase at one end of the secondary arm cylinder pilots the 4-way valve, operating the primary arm piston and cylinder. When the brush passes the front corner of the car and the secondary arm begins to unfold under the influence of a bias spring, the pressure increase at the other end of the secondary arm cylinder pilots the 4-way valve oppositely, reversing the primary arm movement. The blind end flow control is provided with sufficient pressure relief to prevent, at low car speeds, false piloting thereof, but is restrictive enough to pilot the 4-way valve at car speeds above 10 feet per minute.

4 Claims, 8 Drawing Figures

U.S. Patent  April 12, 1977  Sheet 1 of 2  4,016,619
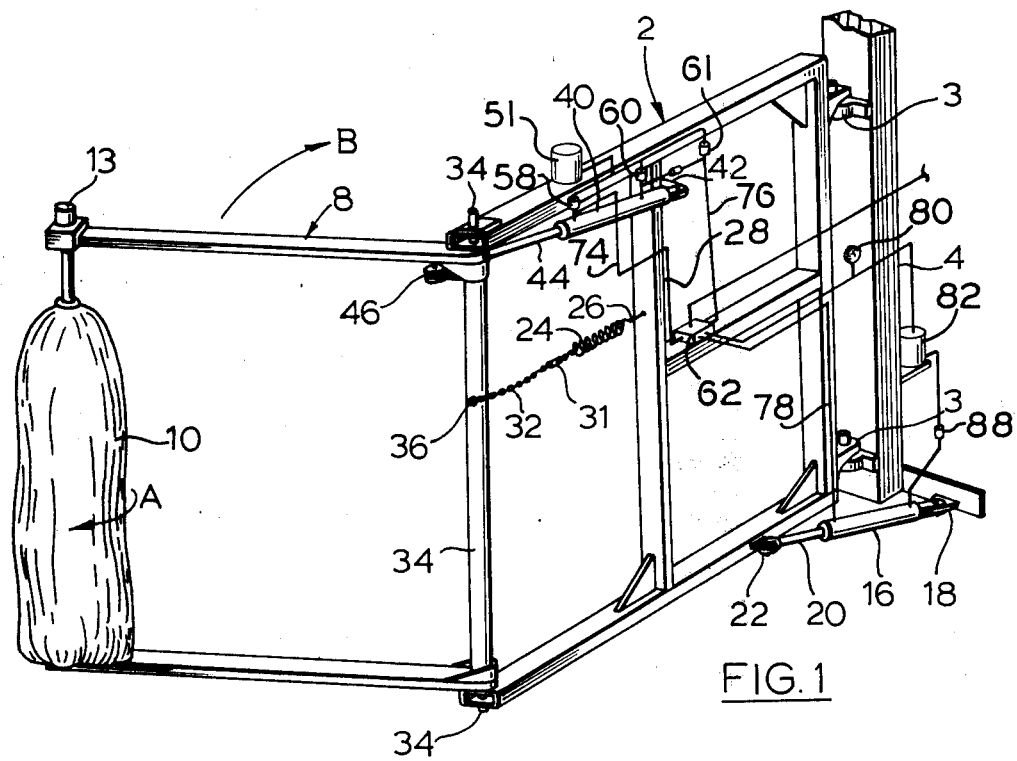
FIG. 1
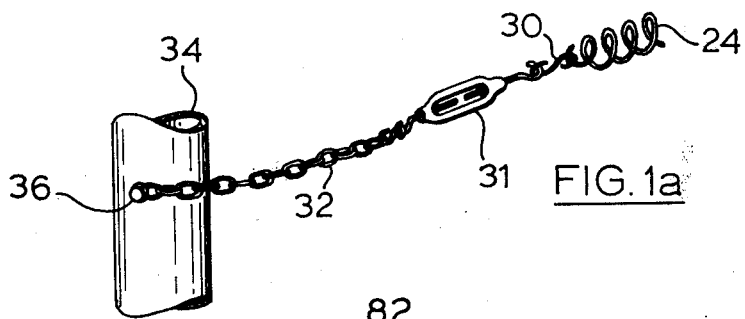
FIG. 1a
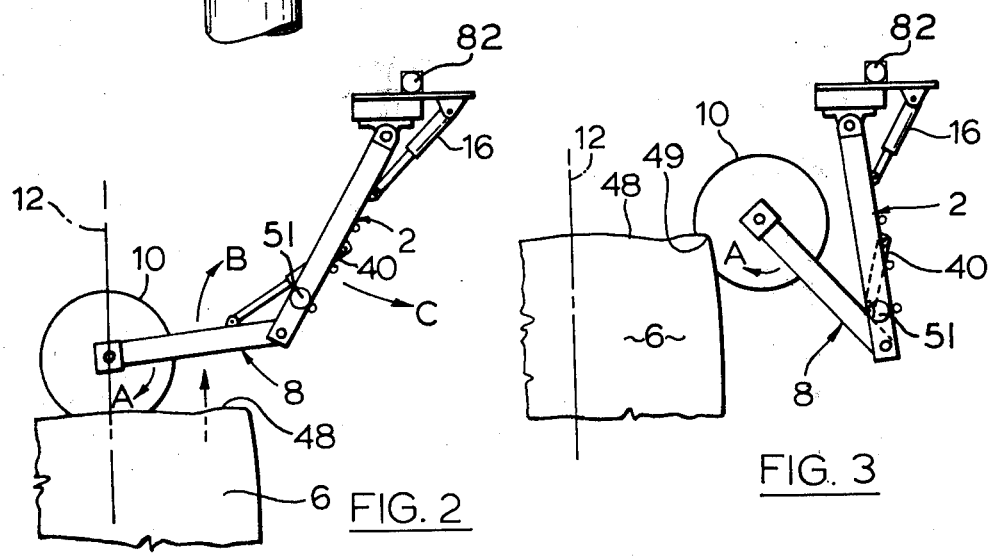
FIG. 2
FIG. 3

CAR WASHING APPARATUS HAVING SLOW SPEED RELIEF

CROSS-REFERENCE TO RELATED APPLICATION

This application corresponds to Canadian patent application, Ser. No. 225,038, filed Apr. 17, 1975, and applicants hereby claim priority thereof.

BACKGROUND OF THE INVENTION

1. Field of the Invention:

This invention relates to an improved control system for car washing apparatus, and in particular for car washing apparatus which washes automatically the front, side and rear of a car as such car passes thereby.

2. Description of the Prior Art

In U.S. Pat. No. 3,624,851, issued Dec. 7, 1971 to Ivan J. Barber, there is shown car washing apparatus having a primary arm pivotally supported on one end at one side of the path of the car and extending rearwardly along such path, a secondary arm pivotally supported at one end from the free end of the primary arm and normally extending approximately transversely over the path of the car, and a brush rotatably mounted on the free end of the secondary arm. As the car moves into contact with the brush, and pushes the secondary arm forwardly relative to the primary arm, a position switch operates and causes actuation of a primary arm piston and cylinder which retracts the primary arm. This draws the brush across the front of the car and the car movement folds the secondary arm relative to the primary arm. When the brush passes around the front corner of the car, a bias pressure begins to unfold the secondary arm relative to the primary arm. This unfolding movement triggers a pressure operated valve, which reverses the primary arm piston and cylinder, causing the primary arm to move outwardly, maintaining the brush against the side of the forwardly moving car and moving the brush inwardly across the rear of the car when the rear corner of the car is reached.

Certain difficulties were experienced with the position switch in this apparatus, such switch employing a one way limit switch and a cam to trigger operation of the primary arm cylinder when the brush was contacted by a car. In order to avoid false triggering, and to permit proper resetting, the mechanism required fairly substantial movement of the cam before it would trigger, and as a result the triggering (i.e. commencement of operation) was not fast and positive. The slow triggering limited the speed of operation of the device and therefore limited the number of cars that could be processed through the apparatus.

SUMMARY OF THE INVENTION

The car washing apparatus of the present invention is characterized by articulated horizontally projecting primary and secondary arms which normally project rearwardly and transversely, respectively, of the path of a car to be washed with the free end of the secondary arm normally positioning a vertically projecting rotary brush centrally within the car path. A bias spring biases the secondary arm to its normal position and primary and secondary cylinders are provided for controlling arm movement with the secondary cylinder being employed to pilot a control valve which controls the primary cylinder. Conduit means lead from opposite ends of the secondary cylinder to respective control ports in the control valve for pressurizing such ports to switch the control valve between its primary cylinder retraction and extension positions. The conduit means leading from the retraction end of the secondary cylinder employs a pressure bleed valve which has sufficient capacity to bleed pressure from the retraction end of such secondary cylinder to a reservoir while the secondary arm is folding slowly on the primary arm to thereby prevent actuation of the control valve when the brush is merely accidentally bumped and moved forwardly in the car path at a relatively slow speed. However, when such brush is moved forwardly by a car at a normal car wash rate of speed, the flow rate from the retraction end of the secondary cylinder is sufficient to exceed the slow capacity of the bleed means, thus pressurizing the operative control port of the control valve means to actuate such control valve and direct pressurizing fluid to the retraction end of the primary cylinder, thus retracting the brush across the front of the forwardly moving car.

The objects and advantages of the present invention will become apparent from a consideration of the following detailed description when taken in conjunction with the accompanying drawings.

BRIEF DESCRIPTION OF THE DRAWINGS

FIG. 1 is a perspective view of car wash apparatus embodying the present invention;

FIG. 1A is a partial perspective view, in enlarged scale, showing how a bias spring is connected between the arms of the car wash apparatus shown in FIG. 1;

FIGS. 2 through 5 are diagrammatic top views of the car washing apparatus shown in FIG. 1 and depicting a car as it progresses therepast;

DESCRIPTION OF THE PREFERRED EMBODIMENTS

Figure 4:
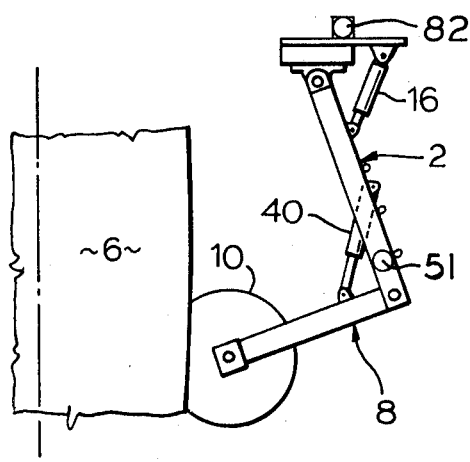
Figure 5:
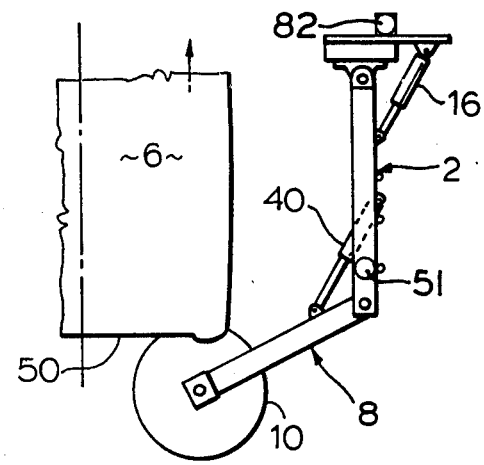

Referring to FIG. 1, the car washing apparatus of the present invention includes a horizontally projecting primary arm 2 pivotally supported at one end on hinges 3 connected to a vertical support post 4. The primary arm 2 normally extends rearwardly of the path of the car 6 (FIGS. 2-5) to be washed, and pivotally supports, from its rearward free end, a secondary arm 8. The secondary arm 8 normally projects transversely of the path of the car 6 and carries a rotary brush 10 at its free end. A brush 10 is mounted from the centrally disposed free extremity of the secondary arm 8 and is normally disposed approximately centrally in the path of the car, adjacent the so-called center line of of wash, which line is indicated at 12 in FIGS. 2-5. Referring to FIG. 5, the brush 10 is rotated in the direction of the arrow A by a motor 13.

The angular position of the primary arm 2 is governed by a primary arm piston 14 and cylinder 16. (FIG. 6) The blind end of the cylinder 16 serves as the extension end and is pivotally connected at 18 to the support post 4, while the rod 20 of the piston 16 is pivotally connected at 22 to the primary arm 2, such rod end of the cylinder serving as the retraction end thereof.

The secondary arm 8 is held in its extended position shown in FIGS. 1 and 2 by a very stiff coil spring 24. The spring 24 is secured at one end by a hook 26 to a bracing vertical member 28 of the primary arm 2. At its other end, the spring 24 is connected by a hook 30 to a turnbuckle 31 connected to a chain 32 which is wrapped part way around a main pivot post 34 forming part of the secondary arm 8. The chain 32 is secured to the post 34 by a bolt 36 (FIG. 1A) which passes through a link of the chain and into a threaded aperture (not shown) in the post 34. Referring to FIG. 1, when the secondary arm 8 folds in the direction of arrow B on the primary arm 2, the post 34 rotates as part of the secondary arm, wrapping the chain 32 around the post and stretching the spring 24 to thus cause the spring 24 to bias the secondary arm 8 to its unfolded position. The turnbuckle 31 is adjusted to remove the slack from spring 24, so that the spring biases the secondary arm 8 to its rest position with a very slight amount of pressure. Thus, the car meets with relatively little resistance as it initially folds the secondary arm relative to the primary arm to help prevent damage to the front license plate of the car.

A control system 38 (FIG. 6) is connected across the piston of the secondary arm cylinder 40 and includes a reservoir 51 containing hydraulic fluid. The top of the reservoir 51 is effectively open to atmosphere, via inlet 52. A nipple 53 located at the side of the reservoir 50 is connected via a conduit 54 to a T connection 56, through which hydraulic fluid is conducted through flow control valves 58 and 60, to opposite ends of the secondary arm cylinder 40. Each flow control 58 and 60 consists of a check valve and needle valve connected in parallel, permitting free flow in one direction and restricted flow in the other direction, which other direction is indicated by the directional arrows in FIG. 6. A relief valve 61 is connected in parallel with the flow control valve 60 and is set to permit flow in the direction of the arrow when the pressure at the butt end of cylinder 40 exceeds a predetermined level.

Figure 6:
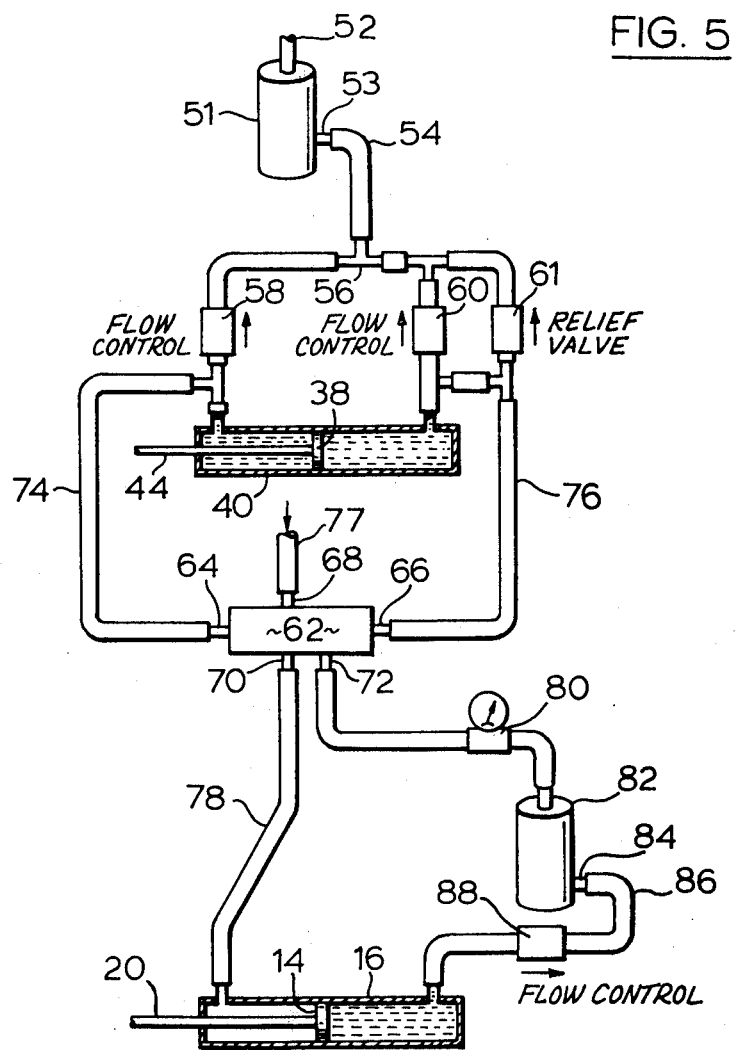
FIG. 6 is a diagrammatic view of a hydraulic-pneumatic circuit according to the invention.

Still referring to FIG. 6, the control system further includes a four-way spool valve 62, typically a Maxam 4-way valve Model No. 705-225H20A made by Compair Canada Ltd., Maxam Nopak Division, Clarkson, Ontario. The valve 62 includes control fluid inlets 64 and 66 on opposite ends thereof, a working fluid inlet 68 on one side thereof and working fluid outlets 70 and 72 on the opposite sides thereof. When pressure is applied to control fluid inlet 64, the valve spool (not shown) is shifted to the right as drawn, connecting the working fluid inlet 68 to outlet 72. When pressure is applied to control fluid inlet 66, the valve spool is shifted to the left as drawn, connecting inlet 68 to working fluid outlet 70. As shown, the control fluid inlet 64 is connected via conduit 74 to the rod on first end of the secondary arm cylinder 40, while control fluid inlet 66 is connected via conduit 76 to the butt or second end of cylinder 40.

Compressed and pressure regulated air from an appropriate source (not shown) is admitted via conduit 77 to the working fluid inlet 68 of the valve 62. The working fluid outlet 70 is connected directly via conduit 78 to the first or rod end of the primary arm cylinder 16, while the working fluid outlet 72 is connected through a pressure regulator 80 to a hydraulic fluid reservoir 82. A nipple 84 at the side of the reservoir 82 is connected via a conduit 86 and flow control valve 88 to the butt or second end of the primary arm cylinder 16.

In operation, when the front end 48 of the car being washed contacts the brush 10 and begins to fold the secondary arm 8 on the primary arm 2, the secondary arm piston 38 is pushed to the right as shown in FIG. 6 to cause a pressure increase at the blind end of the secondary arm cylinder 40. This pressure increase, conducted to the control fluid inlet 66 of the valve 62, pushes the valve spool (not shown) to the left as drawn, connecting the air supply at inlet 68 to conduit 70 and hence to the rod end of primary arm cylinder 16. This initiates retraction of the primary arm piston 14, causing the primary arm to retract in the direction of the arrow C (FIG. 2) to draw the brush 10 across the front of the car 6 at a speed dictated by the flow control valve 88 limiting the flow rate from the cylinder 76. The flow control 60 and relief valve 61 create a restriction to backflow of fluid into the reservoir 51, thus retaining the necessary pressure increase in conduit 76 leading to the four-way spool valve 62.

When the brush 10 passes the front corner of the car, as shown in FIG. 3, the secondary arm 8 begins to unfold, due to the pressure of bias spring 24 and also due to the rotation of brush 10 which tends to roll rearwardly along the side of the car. The unfolding action of the arms carries the secondary arm piston 38 to the left as drawn in FIG. 6. The speed at which the secondary arm 8 unfolds along the side of the car is limited by flow control 58. This flow control is set so that secondary arm 8 unfolds smoothly and without slamming, but quickly enough so that the secondary arm 8 is fully unfolded by the time the brush 10 reaches the back of the car (so that the back of the car will be washed).

As the secondary arm 8 begins to unfold, drawing the piston 38 to the left as viewed in FIG. 6, the flow control valve 58 restricts pressure escape creating a pressure increase in conduit 74 leading to the left end of the valve 62 to buildup pressure in the port 64 until the secondary arm reaches a position projecting perpendicular to the car path, at which the spool in the spool valve 62 is shifted to the right (FIG. 6) thereby communicating the inlet 68 with the outlet 72. This pressurizes the hydraulic fluid in reservoir 82, causing the primary arm piston 14 to move to be urged to the left (FIG. 5) and, once the rear corner of the car is cleaned to extend the primary arm 2 and carry the brush 10 across the rear 50 of the car.

It will be appreciated that the connection of the flow control 60 in parallel with the relief valve 61 is an important feature of the invention to thus cause the control to trigger quickly when the car contacts the brush 10 and pushes it forwardly as the pressure builds up at the blind end of the secondary arm cylinder 40 to pilot the four-way valve 62 promptly. However, it is important that the initial triggering of the apparatus, when the car contacts the brush 10, not be too positive. If the triggering were too positive, then when the apparatus is washing the rear of a car, in the event the brush 10 should catch on a projecting bumper portion and pull itself ahead slightly, the four-way valve 62 would be re-piloted to cause the primary arm piston 14 to retract. Since there would be no car present to cause reversal of the primary arm piston, the piston 14 would retract until the arms were fully moved to one side, thus taking the washing apparatus out of position for washing the following car.

The function of the flow control valve 60 is to prevent re-piloting at the rear of the car (or wherever the secondary arm 8 takes a small bounce forward relative to the primary arm 2). The flow control valve 60 temporarily relieves the pressure that would otherwise be created during such small movements, thereby preventing piloting. When the car strikes the brush 10 and carries it forwardly rapidly however (at a speed of 10 feet per second or more), the pressure created at the blind end of the cylinder 40 is sufficient, despite the bleed provided by flow control valve 60, to shift the valve spool of four-way valve 62, thereby initiating retraction of the primary arm 2.

The relief valve 61 serves both as a flow control and as a safety device. Depending on the speed at which the car wash line is operated, the relief valve 61 operates to bypass fluid in excess of that which is able to pass through the flow control 60. The relief valve 61 also acts as a safety device in case the car hits the brush 10 at too high a speed to thus bypass fluid and prevent damage to the primary and secondary arms and their cylinders as the car moves forceably forward.

The flow control valve 60 and relief valve 61 are selected and adjusted so that piloting of the four-way valve 62 occurs when the brush 10 is carried forward steadily at a speed of 10 feet per minute or more. At lower speeds, no piloting occurs. The selection and adjustment will usually be for a car speed or range of car speeds within the range from 10 feet per minute to 100 feet per minute (since car wash lines may be operated at various speeds within this range). For this purpose, the relief valve 61 is set to open at a pressure which may vary between 30 and 100 p.s.i.; a preferred value being 65 p.s.i. (for a car speed of 60 feet per minute). With the relief valve 61 adjusted to open in this range, the flow control 60 can be set so that it is not too restrictive (if it was too restrictive, piloting could occur at car speeds of less than 10 feet per minute), nor too open (in which case too high a car speed would be needed to create sufficient pressure build-up to operate the four-way valve). At any selected car speed or range of speeds in the range between 10 and 100 feet per minute, the flow control valve 60 will permit enough pressure to remain at the butt end of cylinder 40 to pilot the four-way valve 62, and the relief valve 61 will bypass any fluid excess to that needed to pilot the four-way valve and which cannot pass through flow control valve 60.

No relief valve is needed in parallel with the flow control 58, because this flow control simply limits the speed at which the secondary arm unfolds along the side of the car, and also provides sufficient pressure build-up to re-pilot the four-way valve 62 when the brush 10 passes the corner of the car.

Figure 7:
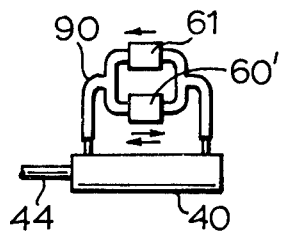
FIG. 7 shows a portion of a modified circuit according to the invention.

A further factor which helps to prevent the four-way valve 62 from being piloted too positively is the venting of the hydraulic fluid in reservoir 50 to the atmosphere through inlet 52. The resultant low pressure supply of hydraulic fluid helps to ensure that the piloting of valve 68, while positive, is not unduly positive. If desired, since reservoir 50 serves essentially as a make-up chamber, to supply fluid in case of leaks, reservoir 50 can be eiliminated if leakage of fluid is adequately controlled. In that event, flow controls 58 and 60 can be embodied in a single flow control 60' (FIG. 7) with the relief valve 61 in parallel therewith. Flow control 60' may consist of a simple restriction in the conduit 90 connecting the rod and butt ends of the cylinder 40.

Alternatively, in some cases (depending on the positioning of components and the length of the hoses) it may be desirable to apply a small charge of air (e.g. air at 3 or 4 p.s.i.) to the inlet 52 of reservoir 50, to keep the system primed. Reservoir 50 may also be formed as two separate unconnected reservoirs, one for the rod end and one for the butt end of the secondary arm cylinder.

If desired, the conduit 78 which in FIG. 6 is shown as connected directly to the rod end of the primary arm cylinder 16, can instead be connected through a regulator to a hydraulic fluid reservoir (not shown) which is in turn connected to the rod end of cylinder 16.

Obviously, many modifications and variations of the present invention may be made with regard to the foregoing detailed description without departing from the spirit of the invention.

We claim:

1. Car washing apparatus having slow speed relief for washing the front, sides and rear of a car as it moves along a car path at a speed above a predetermined speed and comprising:

a horizontally projecting primary arm having first and second ends, said primary arm being pivotally supported on said first end at one side of the path of said car and extending rearwardly from said first end along said path;

a horizontally projecting secondary arm pivotally supported on one end from said second end of said primary arm and normally extending substantially transversely over said path;

bias means biasing said secondary arm to said normal position;

a brush carried on the free end of said secondary arm and rotatable about a vertical axis;

a primary arm fluid cylinder connected to said primary arm to retract and extend said primary arm, said primary arm cylinder having first and second ends;

a secondary arm fluid cylinder connected between said primary and secondary arms, said secondary arm cylinder having first and second ends and being operative in response to travel of said brush along said car path at said predetermined speed to retract its piston at a sufficient rate to develop a predetermined pressure in its second end, and upon unfolding of said secondary arm under the influence of said bias means to develop a selected pressure in said first end thereof;

control valve means having a working fluid inlet port and first and second working fluid outlet ports, said control valve means further including first and second pressure control ports, said valve means being operative in response to said selected pressure in said second pressure control port, to communicate said working fluid inlet port with said first working fluid outlet port, and in response to said predetermined pressure in said first pressure control port to communicate said working fluid inlet port with said second outlet port;

a pressure source connected with said inlet port;

a secondary cylinder reservoir;

first conduit means connecting said second end of said secondary arm cylinder with said reservoir and said first pressure control port and including relief means for relieving pressure from said second end to said reservoir upon folding of said secondary arm on said primary arm at a sufficiently slow rate to develop a pressure in said second end less than said predetermined pressure;

second conduit means connecting said first working fluid outlet port with said second end of said primary cylinder;

third conduit means connecting said second outlet port with said first end of said primary cylinder to retract said cylinder upon pressurization thereof; and fourth conduit means connecting said first end of said secondary cylinder with said second control fluid port for delivery to said control port of said selected pressure upon unfolding of said secondary arm whereby contact of a car moving along said path with said brush above said predetermined speed will develop said predetermined pressure in said second end of said secondary cylinder to apply said predetermined pressure to said first control port to operate said control valve means and communicate said working fluid inlet port with said first end of said primary cylinder to retract said primary arm to draw said brush across the front of said car and as said secondary arm unfolds passing a position perpendicular to said path of said car said bias means will commence unfolding said secondary arm on said primary arm to push said brush rearwardly along the side of said car while directing fluid through said fourth conduit to develop said selected pressure in said second control port to activate said control valve means and communicate said working fluid inlet port with said first outlet port to extend said primary cylinder to extend said primary arm accordingly to urge said brush inwardly across the rear of said car as it clears the rear corner thereof.

2. Car washing apparatus as set forth claim 1 wherein:
said control valve means includes a flow control valve and a pressure relief valve connected in parallel, said pressure relief valve being operative at a pressure above said predetermined pressure to provide for relatively unrestricted flow therethrough to enable relatively free folding of said secondary arm on said primary arm.

3. Car washing apparatus as set forth in claim 1 wherein:
said bias means is in the form of a coil tension spring connected between said primary and secondary arms.

4. Car washing apparatus as set forth in claim 1 that includes:
fifth conduit means connecting said retraction end of said secondary cylinder with said reservoir and including flow control means for controlling the rate at which said secondary arm unfolds on said primary arm.

* * * * *